(No Model.)

G. B. VAN VLEET.
Post Hole Digger.

No. 236,655. Patented Jan. 11, 1881.

Witnesses.
F. L. Ourand
C. M. Alexander

Inventor:
Gilbert B. Van Vleet
By Alexander Mason

UNITED STATES PATENT OFFICE.

GILBERT B. VAN VLEET, OF LODI, NEW YORK.

POST-HOLE DIGGER.

SPECIFICATION forming part of Letters Patent No. 236,655, dated January 11, 1881.

Application filed October 20, 1880. (No model.)

*To all whom it may concern:*

Be it known that I, GILBERT B. VAN VLEET, of Lodi, in the county of Seneca, and in the State of New York, have invented certain new and useful Improvements in Post-Hole Diggers; and I do hereby declare that the following is a full, clear, and exact description thereof, reference being had to the accompanying drawings, and to the letters of reference marked thereon, making a part of this specification.

This invention has for its object to provide an improved implement for digging fence-post holes and other similar purposes, which can be inserted in the ground like an ordinary spade, and when inserted to the proper depth can, by means of proper mechanism, be transformed into a lifter, whereby the earth may be readily and conveniently removed, as more fully hereinafter specified. These objects I attain by the device illustrated in the accompanying drawings, in which—

Figure 1:
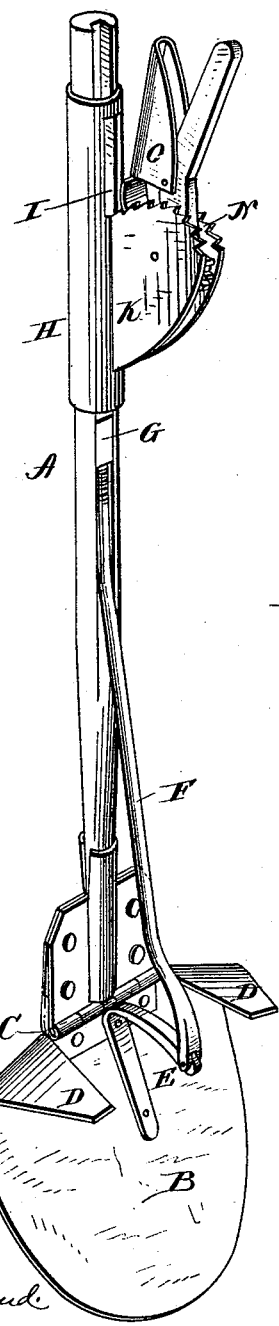
Figure 2:
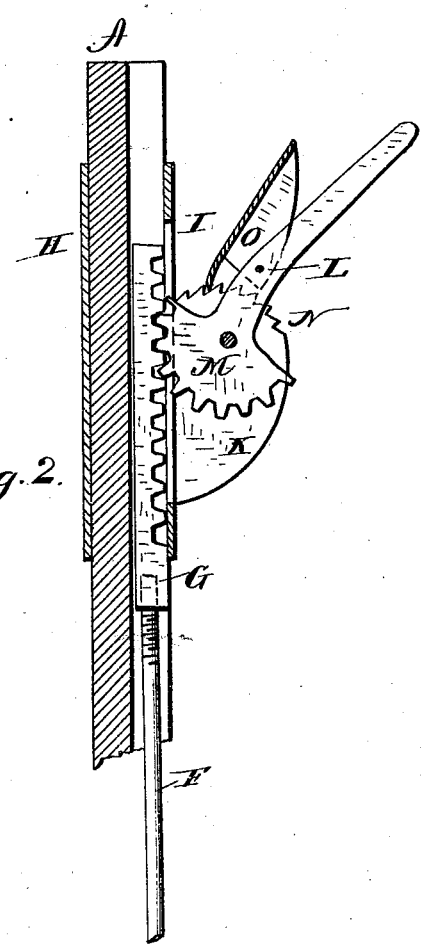

Figure 1 represents a perspective view of my improved implement; and Fig. 2, a sectional view, showing the mechanism for operating the shovel or blade thereof in detail.

The letter A indicates a straight handle, which may be constructed of wood, metal, or other material, carrying a shovel or blade, B, at its lower end, which is hinged at C, so that it can be caused to assume any position with respect to the handle, varying from a straight line therewith to a right angle. The said shovel, at its shoulders, is provided with extensions D, extending forward at or about right angles to the blade, which form stops to limit the extent of its insertion into the ground, in order to permit the position of the blade to be shifted without hinderance when inserted. To the blade of the shovel is secured a bent arm, E, to the free end of which is pivoted the end of a curved rod, F, extending backward to the handle. In the present instance the handle is formed with a longitudinal groove, into which the curved rod passes, the said rod extending toward the rear end of the handle; but in practice it will be found more convenient to make the handle hollow, with an opening near the lower end, through which the rod F extends into the handle. The upper end of the said rod F is screw-threaded, or provided with other means by which may be secured to it one end of a sliding rack, G, located in the upper part of the groove or hollow handle. To the handle is secured a sleeve, H, having a longitudinal slot, I, and two parallel standards, K, between which is pivoted a lever, L, having a toothed segment, M, which engages the teeth of the rack, by means of which said rack may be moved back and forth to operate the shovel-blade. The rear edges of the standards are provided with a series of ratchet-teeth, N, and the lever with a pawl, O, adapted to engage said teeth to hold the lever and other parts in any desired fixed position.

When the handle is made hollow the sleeve may be omitted, the slot in this case being formed directly in the handle, and the standards formed therewith or attached directly to the same in any convenient manner.

Instead of the bent lever-arm attached to the shovel-blade, the said blade may be provided with a short upright at a suitable distance from the hinge, the upright being formed with an eye at its upper end, to which the lower end of the rod F is pivoted, the upright in this case serving as a lever, by means of which the blade may be operated by the said rod F.

The operation of my invention will be readily understood in connection with the above description, and is as follows: The blade, being in line with the handle, as shown in Fig. 1, may be driven into the ground after the manner of an ordinary spade, and when inserted to the proper depth by operating the lever may be brought at right angles to the handle, so that the earth may be lifted vertically and removed. By means of the lever the blade may also be shifted and retained at a proper angle with respect to the handle to enable the device to be employed as a shovel when desired, and when the blade is at right angles to the handle it is evident that the implement may be employed as a hoe to scrape the removed earth into the hole around the fence-post after the same has been set in place.

Having thus fully described my invention, what I claim, and desire to secure by Letters Patent, is—

In combination with the handle A, the hinged shovel B, provided with a lever-arm, E, the curved rod F, pivoted to said lever at its lower end and provided with a sliding rack, G, at its upper end, the ratcheted standards K on the handle, and the lever L and its pawl, whereby the shovel may be operated by hand and conveniently secured at any angle, so as to serve the triple purpose of spade, shovel, and lifter, substantially as specified.

In testimony that I claim the foregoing I have hereunto set my hand and seal this 7th day of October, 1880.

GILBERT B. VAN VLEET. [L. S.]

Witnesses:
H. AUBREY TOULMIN,
JOHN H. STEVENS.